(No Model.)

M. E. PETERSON.
COMBINED FLOUR SCOOP AND SIEVE.

No. 531,857. Patented Jan. 1, 1895.

Witnesses
J. W. Reynolds
S. G. Randall

Inventor
Miles E. Peterson
By John Wedderburn
His Attorney

UNITED STATES PATENT OFFICE.

MILES E. PETERSON, OF IGO, CALIFORNIA.

COMBINED FLOUR SCOOP AND SIEVE.

SPECIFICATION forming part of Letters Patent No. 531,857, dated January 1, 1895.

Application filed October 12, 1894. Serial No. 525,713. (No model.)

*To all whom it may concern:*

Be it known that I, MILES E. PETERSON, a citizen of the United States, residing at Igo, in the county of Shasta and State of California, have invented certain new and useful Improvements in a Combined Flour Scoop and Sieve; and I do hereby declare the following to be a full, clear, and exact description of the invention, such as will enable others skilled in the art to which it appertains to make and use the same.

This invention relates to certain new and useful improvements in combined flour scoops and sieves and it has for its object among others, to provide a simple and cheap device of this character, novel in its construction, as well as in its mode of operation. It comprises essentially a scoop with a flat sieve at one end, and with a crank shaft mounted within the handle, which extends at right angles to the length of the body of the scoop, said handle being carried by a spring plate, and the crank shaft carrying a ratchet cooperating with a stop carried by the scoop, so that as the crank shaft is rotated the lower portion of the scoop is moved bodily toward and from the operator, imparting short, quick and vigorous jars to the scoop and consequently to the sieve.

Other objects and advantages of the invention will hereinafter appear, and the novel features thereof will be particularly pointed out in the appended claims.

The invention is clearly illustrated in the accompanying drawings, which, with the letters of reference marked thereon, form a part of this specification, and in which—

Figure 1:
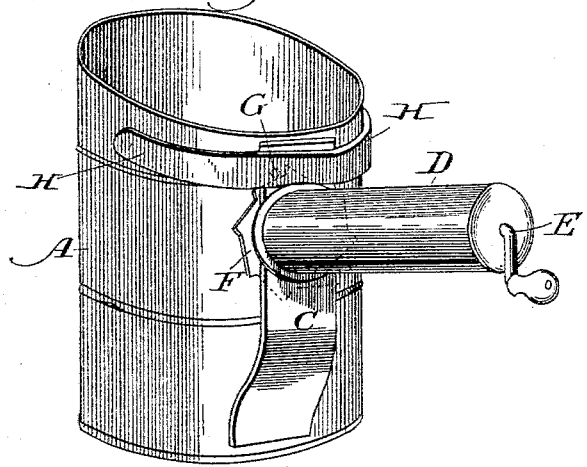
Figure 2:
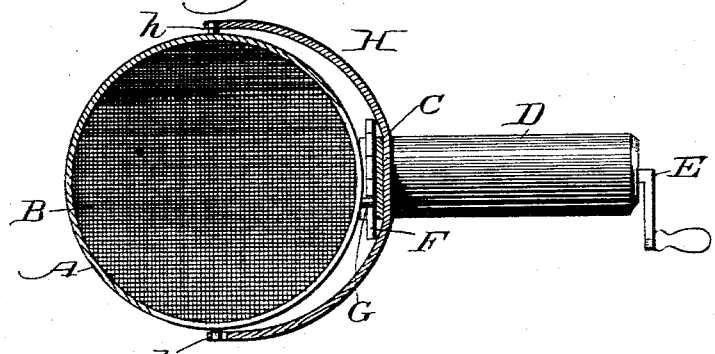
Figure 3:
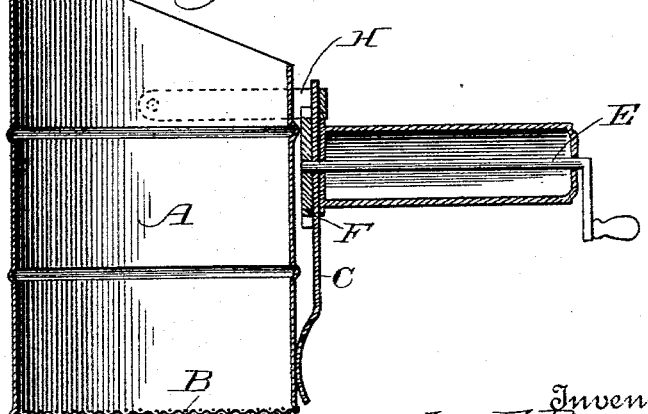

Figure 1 is a perspective view of my improved combined flour scoop and sieve. Fig. 2 is a horizontal section through the semicircular arms. Fig. 3 is a vertical section taken through the handle.

Like letters of reference indicate like parts throughout the several views.

Referring now to the details of the drawings by letter, A designates the scoop proper, which may be of any desired capacity and material, and at one end it is provided with a flat sieve B of any suitable character.

C is a spring plate arranged lengthwise of the scoop and to this plate is attached the handle D, which is tubular in form, and through which runs centrally a crank shaft E provided with a suitable handle upon its outer end, whereby it may be rotated, and at its inner end carrying a ratchet wheel F which is arranged between the scoop and the said spring plate. This ratchet wheel may be provided with any suitable number of teeth, being shown in this instance with eight, but it may be more or less as may be desired. A stud or post G projects from the body of the scoop outward in position to be engaged by the said ratchet wheel.

H is a semi-circular arm secured at its ends as shown at $h$, to the body of the scoop near its open end, and firmly secured to the upper end of the spring plate which carries the handle.

With the parts constructed and arranged substantially as above set forth, the operation is as follows: When the crank shaft is turned forward, the ratchet wheel which works directly under the stud, acting thereagainst, throws the bottom of the scoop in direction toward the operator until the highest point on the ratchet is passed, when the spring plate pressing against the scoop serves to produce a reverse motion, thus giving a quick, short and vigorous jerk or jar to the scoop, and one revolution of the crank shaft or ratchet will impart to the scoop and sieve as many of these sudden and vigorous jars as there are teeth on the ratchet wheel.

The simplicity and advantages of my improved device are recommended to those having occasion to use such articles. The operation is performed by a shaking motion instead of by a grinding motion as heretofore. The scoop is entirely free from interior instrumentalities and impediments, and thus gives a freer action to material.

Modifications in detail may be resorted to without departing from the spirit of the invention or sacrificing any of its advantages.

Having thus described the invention, what I claim is—

1. The combination with a scoop, of a spring plate secured thereto, a handle on the plate with a crank shaft, and means actuated by the crank shaft for giving movement to the scoop.

2. The combination with a scoop, of a spring plate held thereto at one end, a handle on the plate, a crank shaft carried by the handle, and a ratchet wheel carried by the crank shaft, and adapted to engage a projection on the scoop.

In testimony whereof I have signed this specification in the presence of two subscribing witnesses.

MILES E. PETERSON.

Witnesses:
W. P. MATHEWS,
J. R. SWEENY.